United States Patent
Song et al.

(10) Patent No.: US 7,438,766 B2
(45) Date of Patent: Oct. 21, 2008

(54) ROBOT CLEANER COORDINATES COMPENSATION METHOD AND A ROBOT CLEANER SYSTEM USING THE SAME

(75) Inventors: Jeong-Gon Song, Gwangju (KR); Sam-Jong Jeung, Gwangju (KR); Ki-Man Kim, Gwangju (KR); Ju-Sang Lee, Gwangju (KR); Jang-Youn Ko, Gwangju (KR); Kwang-Soo Lim, Seoul (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 541 days.

(21) Appl. No.: 11/071,851

(22) Filed: Mar. 3, 2005

(65) Prior Publication Data

US 2006/0076039 A1     Apr. 13, 2006

(30) Foreign Application Priority Data

Oct. 12, 2004  (KR) .................. 10-2004-0081200

(51) Int. Cl.
*B08B 7/04* (2006.01)
*G05D 1/00* (2006.01)

(52) U.S. Cl. ................... 134/18; 318/587; 15/319
(58) Field of Classification Search ............ 134/18, 134/21; 15/319; 318/587
See application file for complete search history.

(56) References Cited

U.S. PATENT DOCUMENTS

| 5,208,521 A | 5/1993 | Aoyama ............... 318/587 |
| 5,284,522 A | 2/1994 | Kobayashi et al. ....... 134/18 |
| 5,440,216 A | 8/1995 | Kim .................... 318/587 |
| 5,446,356 A | 8/1995 | Kim .................... 318/587 |
| 5,559,696 A | 9/1996 | Borenstein ........... 364/424.02 |
| 5,646,494 A | 7/1997 | Han .................... 318/587 |

(Continued)

FOREIGN PATENT DOCUMENTS

EP     1435554     4/2003

(Continued)

OTHER PUBLICATIONS

Preliminary Search Report issued on Mar. 2, 2006 from the French Patent Office with respect to French Patent Application No. 0502912 filed on Mar. 24, 2005.

(Continued)

*Primary Examiner*—Michael Barr
*Assistant Examiner*—Saeed T Chaudhry
(74) *Attorney, Agent, or Firm*—Ohlandt, Greeley, Ruggiero & Perle, LLP.

(57) ABSTRACT

A coordinates compensation method of a robot cleaner using an angle sensor compensates coordinates of the robot cleaner with reference to absolute coordinates of a recharging station, so as to improve robot cleaner's path following. The robot cleaner is in a standby mode at the recharging station, and moves to an operation area to perform a given job. The robot cleaner stops the given job upon determining an accumulative angle exceeding a predetermined level, and returns to the recharging station. Current coordinates of the robot cleaner are aligned with reference coordinates of the recharging station, and the robot cleaner moves to a previous spot where it was before it returns to the recharging station, and resumes the work from where it stopped.

8 Claims, 6 Drawing Sheets

U.S. PATENT DOCUMENTS

| | | | | |
|---|---|---|---|---|
| 5,959,523 | A | * | 9/1999 | Westberg .................... 336/234 |
| 6,025,687 | A | | 2/2000 | Himeda et al. .............. 318/586 |
| 7,133,745 | B2 | * | 11/2006 | Wang ......................... 700/258 |
| 2002/0153185 | A1 | | 10/2002 | Song et al. .................. 180/167 |

FOREIGN PATENT DOCUMENTS

| | | |
|---|---|---|
| JP | 04-053515 | 2/1992 |
| JP | 10-240342 | 11/1998 |
| JP | 2001-325023 | 11/2001 |
| JP | 2004-212382 | 7/2004 |
| KR | 10-2004-000812 | 1/2004 |
| KR | 10-2004-0062038 | 7/2004 |
| RU | 2210492 | 8/2003 |

OTHER PUBLICATIONS

Office Action issued by the Russian Patent Office dated Dec. 7, 2005 from corresponding Russian Patent Appln. 2005108491 filed Mar. 22, 2005.

British Combined Search and Examination Report dated Jun. 21, 2005.

Dutch Search Report dated Jul. 19, 2005.

* cited by examiner

ROBOT CLEANER COORDINATES COMPENSATION METHOD AND A ROBOT CLEANER SYSTEM USING THE SAME

CROSS-REFERENCE TO RELATED APPLICATIONS

This application claims the benefit of Korean Patent Application No. 2004-81200 filed Oct. 12, 2004, in the Korean Intellectual Property Office, the disclosure of which is incorporated herein by reference.

BACKGROUND OF THE INVENTION

1. Field of the Invention

The present invention relates to a robot cleaner for automatic operation, and more particularly, to a coordinate compensation method for an automatic robot cleaner.

2. Description of the Related Art

A robot cleaner generally determines the target area of cleaning operation using sensors such as ultrasound sensor mounted on a main body, or in accordance with information input by a user. The robot cleaner then plans a most efficient path of cleaning operation. According to the plan, the robot cleaner runs and drives a dust sucking part to draw in dust from the floor.

One way of moving such a robot cleaner along the planned path is that the robot cleaner calculates the current location using absolute coordinate system. Another method is that the robot cleaner runs based on a relative coordinate system using running distance and rotation angle with respect to a reference location of the cleaning area.

According to one example of using the absolute coordinate system, a robot cleaner captures through a CCD camera the images of objects on the ceiling such as ceiling lamp, or location recognition marks which may be separately installed on the ceiling, and accordingly detects its current location based on the captured images. Using the CCD camera, however, causes problems of high costs because it requires the system to fast process a large amount of data.

According to one example of using the relative coordinate system, a robot cleaner is equipped with a running distance sensor and an angle sensor which can detect rotational angle of the robot cleaner. An encoder is generally used as the running distance sensor to detect number of rotation of the wheels, and a gyro sensor, which is capable of detecting relative angle, is generally used as the angle sensor. It is simple to control when using the gyro sensor because the robot cleaner can rotate at a precise angle as desired. However, such a gyro sensor usually has a detection error ranging from 5% to 10%, and a problem occurs as the robot cleaner repeats rotation operation because the detection error accumulates. As a result, the robot cleaner may not follow the planned path accurately.

FIG. 1 shows, in a rather exaggerated manner, the running path of the robot cleaner deviating from the planned path due to detection error of the gyro sensor. A robot cleaner 1 begins from the starting point S and runs straightforward as calculated to the spot A. Using the gyro sensor, the robot cleaner 1 rotates by 90°, runs straightforward as calculated and therefore, arrives at the spot B. At this time, the robot cleaner 1 misses the intended destination, that is, the spot B, but instead arrives at spot B'. The robot cleaner 1 rotates by 90° using the gyro sensor, and moves straightforward as calculated, and perceives to have arrived at the spot C. However, again due to detection error of the gyro sensor, the robot cleaner 1 actually does not follow the planned path, but instead reaches the deviated spot C'. As the detection error accumulates, the deviation is greater at the spots C, C' than the spots B, B'. The robot cleaner 1 moves through the spots D, E, F and G in sequence, with incrementing detection error of the gyro sensor. As a result, the robot cleaner 1 is deviated from the planned path more and more as it operates further. When the robot cleaner 1 finishes cleaning operation, there remain certain areas which have not been cleaned.

SUMMARY OF THE INVENTION

The present invention has been developed in order to solve the above drawbacks and other problems associated with the conventional arrangement. An aspect of the present invention is to provide a method for compensating for a coordinate system of a robot cleaner such that the robot cleaner can effectively follow a planned running direction using angle sensor such as a gyro sensor.

It is another aspect of the present invention to provide a robot cleaner which uses a coordinate compensation method such that the robot cleaner can effectively follow a planned running direction using angle sensor such as a gyro sensor.

The above aspects and/or other features of the present invention can substantially be achieved by providing a coordinates compensation method of a robot cleaner, which comprises standby step in which the robot cleaner is in a standby mode at a recharging station, operation step in which the robot cleaner moves to an operation area to perform a given job, returning step in which the robot cleaner stops the given job upon determining an accumulative angle exceeding a predetermined level, and returns to the recharging station, coordinates compensation step in which current coordinates of the robot cleaner are compensated with reference coordinates of the recharging station, and operation resuming step in which the robot cleaner moves to a previous spot where it was before it returns to the recharging station, and resumes the given job.

The coordinates compensation step comprises the steps of the robot cleaner positioning on the reference coordinates of the recharging station by using a plurality of distance sensors, and compensating the current coordinates of the robot cleaner to an origin of the robot cleaner.

The recharging station comprises a reference plate which is disposed in a substantially perpendicular relation with respect to a floor on which the robot cleaner moves.

According to one aspect of the present invention, a robot cleaner system comprises a recharging station, and a robot cleaner comprising a plurality of distance sensors, and a control part for compensating coordinates thereof to reference coordinates of the recharging station by use of the plurality of distance sensors.

The plurality of distance sensors are arranged side by side, with transmitting parts thereof aligned in a substantially perpendicular relation with respect to an axis of driving wheel of the robot cleaner. The plurality of distance sensors are arranged in a line, with front sides thereof substantially parallel with an axis of the driving wheel.

The recharging station comprises a reference plate which is disposed in a substantially perpendicular relation with respect to a floor on which the robot cleaner moves.

The control part controls such that the robot cleaner stops a given job upon determining an accumulative angle exceeding a predetermined level, and returns to the recharging station, and current coordinates of the robot cleaner are aligned with reference coordinates of the recharging station by use of the plurality of distance sensors, and the current coordinates of the robot cleaner are compensated to an origin.

With the coordinates compensation method of a robot cleaner according to the present invention, the origin of the robot cleaner is realigned with reference to the coordinate system of the recharging station when the accumulative error of the angle sensor exceeds a predetermined level. Accordingly, the accumulative error of the angle sensor can be compensated to '0' periodically, and therefore, the robot cleaner's path following is improved.

Additionally, with the robot cleaner system according to the present invention, because the origin of the robot cleaner can be realigned with reference to the coordinate system of the recharging station by use of distance sensors of the robot cleaner when the accumulative error of the angle sensor exceeds a predetermined level, the robot cleaner's path following is improved.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1:
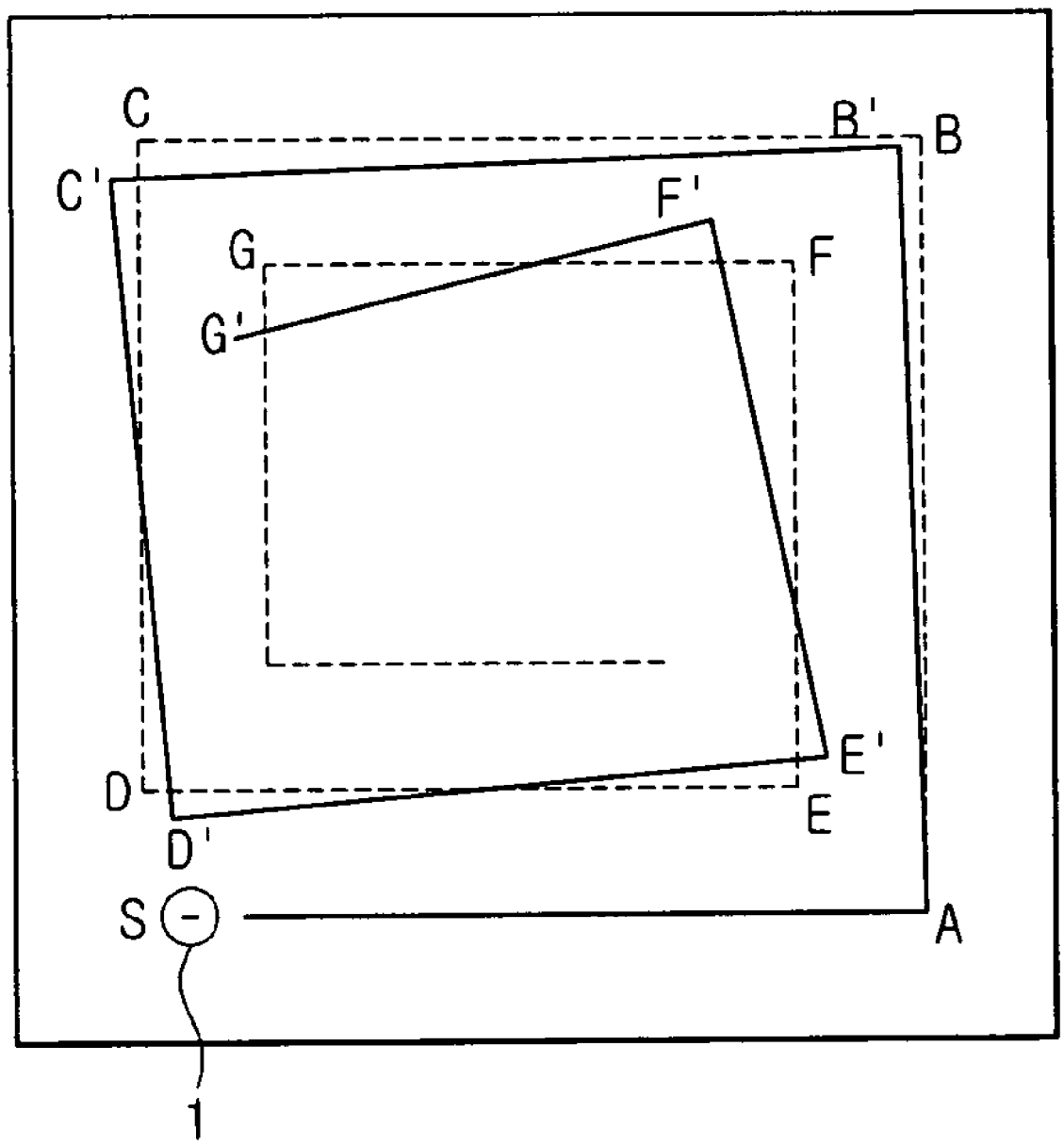
FIG. 1 is a view illustrating a planned operation path for a robot cleaner, and a deviation path followed as the robot cleaner moves.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
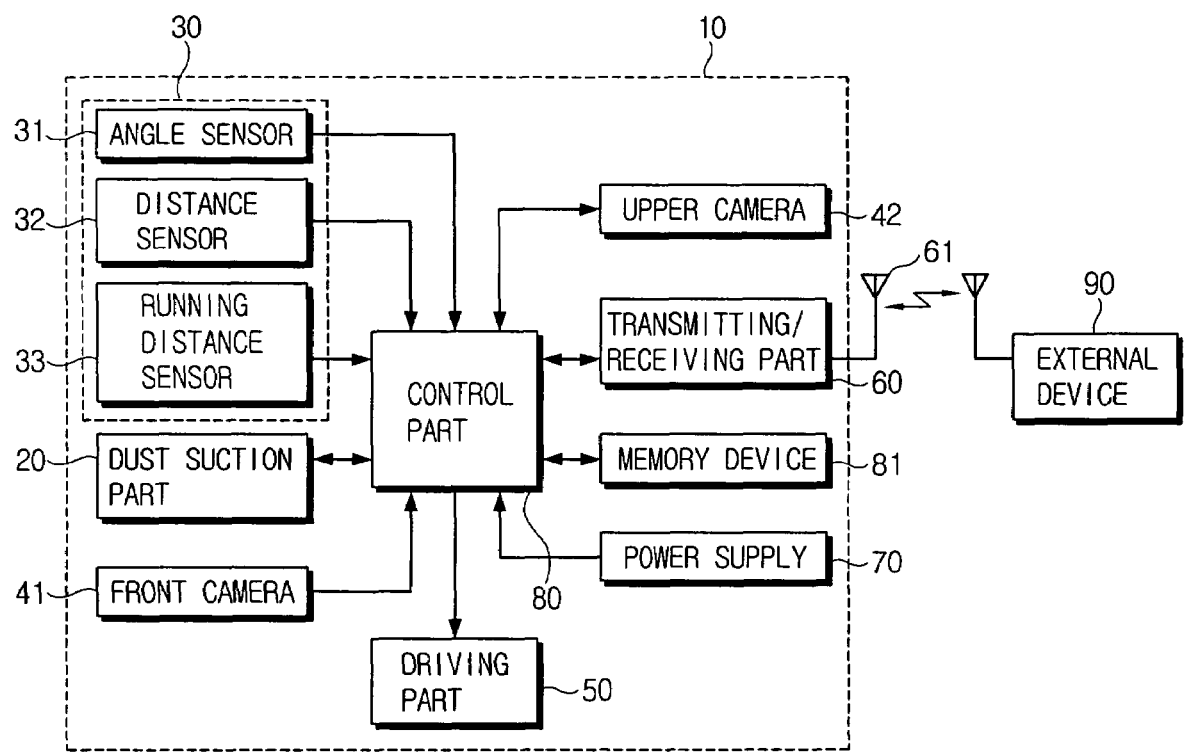
FIG. 2 is a block diagram of a robot cleaner using a coordinate compensation method according to an embodiment of the present invention.
Figure 3:
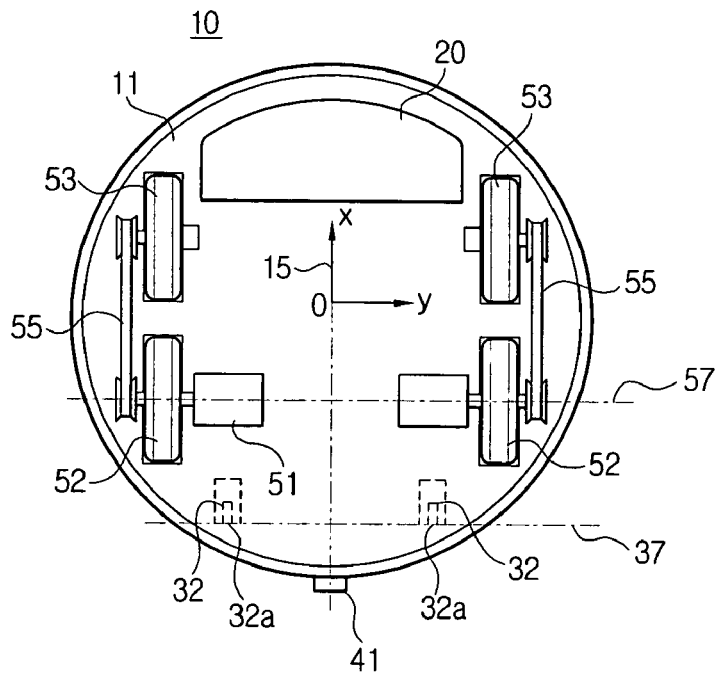
FIG. 3 is a bottom view of the robot cleaner of FIG. 2.
Figure 4:
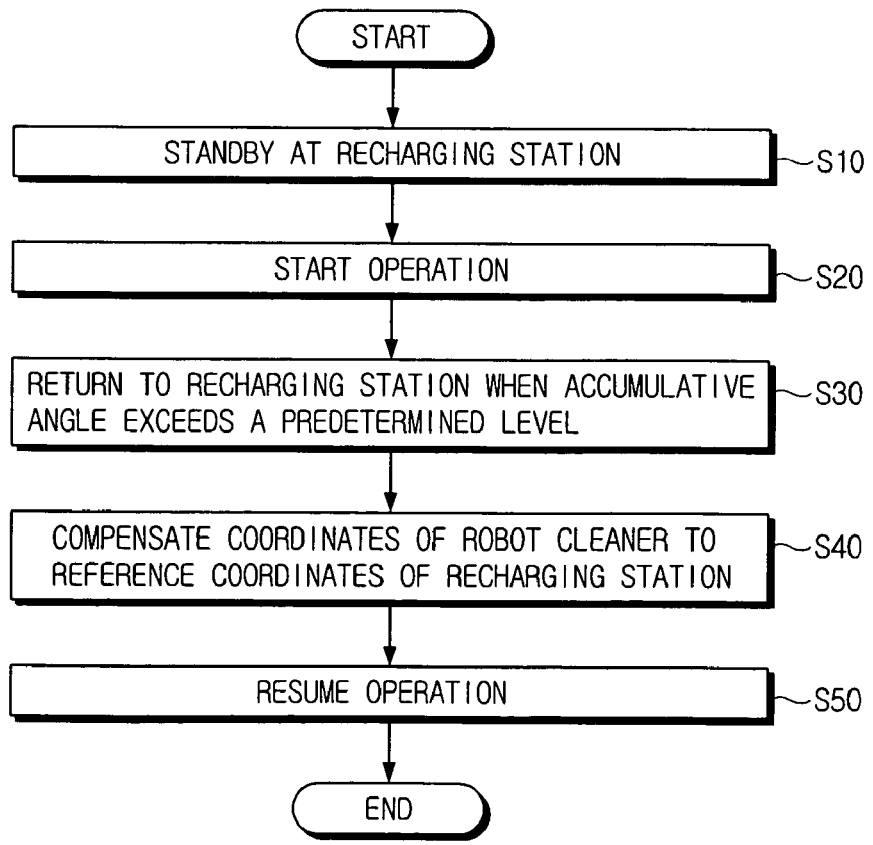
FIG. 4 is a flowchart illustrating a coordinate compensation method of a robot cleaner according to an embodiment of the present invention.
Figure 5:
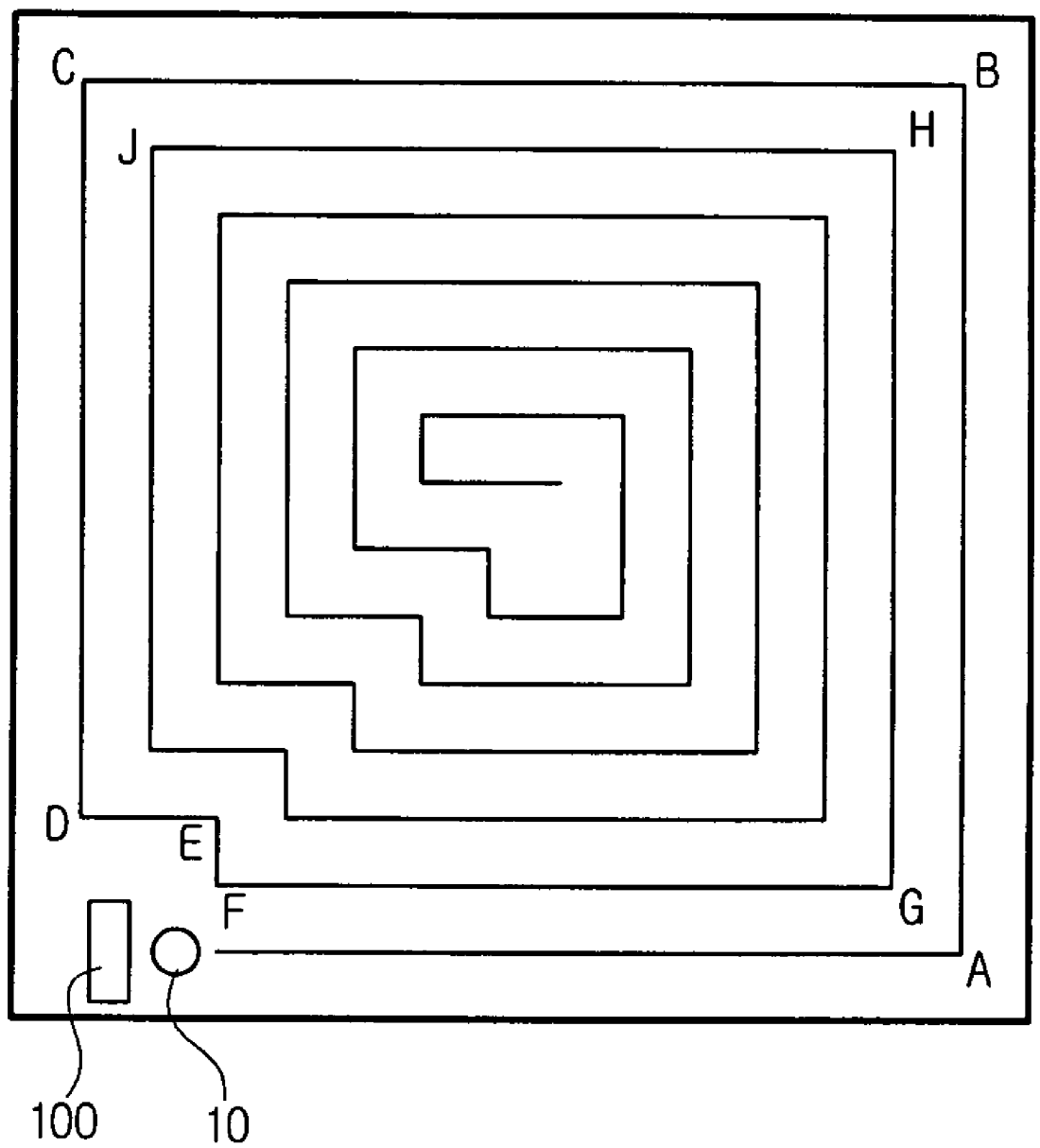
FIG. 5 is a view illustrating a running path of a robot cleaner, for explaining a coordinate compensation method of he robot cleaner according to an embodiment of the present invention.

Referring to FIGS. 2 and 3, a robot cleaner 10 according to an embodiment of the present invention includes a dust suction part 20, a sensor part 30, a front camera 41, an upper camera 42, a driving part 50, a transmitting/receiving part 60, a power supply 70, a memory device 81 and a control part 80, all of which are arranged on a main body 11 at proper places.

The dust suction part 20 may be configured in various shapes as long as it can efficiently draw in dust-containing air from the surface being cleaned. In one example, the dust suction part 20 may include a suction motor, a suction brush which draws in dust-containing air using a suction force from the suction motor, and a dust chamber provided between the suction motor and the suction brush. The dust chamber has a suction port and a discharge port respectively interconnecting with the suction brush and the suction motor. Accordingly, air is drawn in through the suction port, dust is separated at the dust chamber and the cleaned air is discharged through the discharge port.

The sensor part 30 includes a distance sensor 32 which can detect distance to a recharging station 100 (see FIG. 6), a running distance sensor 33 which can detect the distance the robot cleaner 10 has run, and an angle sensor 31 which can detect the rotational angle of the root cleaner 10.

The angle sensor 31 is used when the robot cleaner 10 rotates to change the running direction. More specifically, the angle sensor 31 detects the angle of rotation of the robot cleaner 10 with respect to the current running direction. A gyro sensor may preferably be used as the angle sensor 31.

A plurality of distance sensors 32 may be installed on the front side of the main body 11 to measure a distance to the recharging station 100. As shown in FIG. 3, the plurality of distance sensors 32 may be arranged with transmitting parts 32a thereof being substantially perpendicular to an imaginary line 57 that connects the axes, and more specifically, the centers of the axes of two wheels 52. From the front view, the plurality of distance sensors 32 are parallel arranged at regular intervals. It is also preferred that an imaginary line 37 that connects the front sides of the distance sensors 32 be parallel to the imaginary line 57 that connects the centers of the axes of the wheels 52 such that transmitting sides of the transmitting parts 32a of the distance sensors 32 can be at the same distance from the wheels 52. In a robot cleaner 10 as shown in FIG. 3 which has the two distance sensors 32, and in which the axis of the wheels 52 is in perpendicular relation with the transmitting parts 32a, and the line 37 connecting the front sides of the transmitting parts 32a is in parallel relation with the axis of the wheels 52, the robot cleaner 10 stays at right angles with respect to a reference plate 130 of the recharging station 100 when the distances sensed by the two distance sensors 32 with respect to the reference plate 130 (see FIG. 6) of the recharging station 100 are the same. In other words, x and y coordinate system 15 of the robot cleaner 10 are in parallel relation with x and y coordinate system 105 (see FIG. 6) of the recharging station 100.

Any sensor that can send a out signal to the outside, receives the signal reflected from an object, and measure the distance to the object based on the received signal, may be used as the distance sensor 32. For example, an infrared sensor having a light emitting element which emits infrared ray of light, and a light receiving element receiving reflected infrared light, may be used. Alternatively, a laser sensor that emits a laser beam and receives a reflected laser beam to measure the distance can also be used as the distance sensor 32. If there are a plurality of infrared sensors or ultrasound sensors employed as the obstacle sensors, some of these sensors may be utilized as the distance sensors 32 by installing the sensors according to the requirements for the distance sensors 32.

A rotation sensor may also be utilized as the running distance sensor 33. For example, an encoder, which is employed to detect the number of rotation of the motor, can be utilized as the rotation sensor. Accordingly, the control part 80 may calculate a running distance of the robot cleaner 10 using the number of rotation sensed by the encoder.

The front camera 41 is mounted on the main body 11 to photograph images in front of the robot cleaner 10, and outputs the captured images to the control part 80. The upper camera 42 is mounted on the main body 11 to photograph images above the robot cleaner 10 and outputs the captured images to the control part 80. Both the front and upper cameras 41 and 42 may preferably be a CCD camera. The front and upper cameras 41 and 42 are selectively installed as need arises. For example, the front camera 41 may be used to check the location of the recharging station 100 by detecting recognition marks (not shown) on the recharging station 100, while the upper camera 42 may be used to check the location of the recharging station 100 by detecting the marks (not shown) above the recharging station 100.

The driving part 50 includes two driving wheels 52 formed at both front sides, two driven wheels 53 formed at both rear sides, a pair of driving motors 51 for respectively driving the two driving wheels 52 at the front, and a driving force transmission means 55 installed to transmit the driving power of the driving wheels 52 to the driven wheels 53. The driving force transmission means 55 may include a timing belt and a pulley. Additionally, the driving force transmission means 55 may be formed of gears. The driving wheels 52 may be installed such that center axes thereof can be aligned in a line. The respective driving motors 51 of the driving part 50 are rotated forward or backward independently, and in accordance with the control signal of the control part 80. The running direction can be varied by variably controlling the number of rotation of the driving motors 51, respectively.

The transmitting/receiving part 60 sends out data via an antenna 61, and transmits a signal from the antenna 61 to the control part 80. Accordingly, the robot cleaner 10 can transmit and receive signals with an external device 90 via the transmitting/receiving part 60. The external device 90 may include a computer system or a remote controller which is installed with a program enabling monitoring and controlling on the robot cleaner 10 therethrough The power supply 70 includes a rechargeable battery, which stores therein a power supplied from the power terminal 120 of the recharging station 100. The power supply 70 supplies power to the respective components of the robot cleaner 10 so that the robot cleaner 10 can run and operate automatically.

The control part 80 processes signal received via the transmitting/receiving part 60, and controls the respective parts of the robot cleaner 10 to work as instructed. The control part 80 controls such that the robot cleaner 10 moves along the walls or obstacles using obstacle sensor (not shown), determines an area for cleaning operation, and stores in the memory device 81 the determined area. The operation area of the robot cleaner may also be stored in the memory device 81 by the input of user. The control part 80 calculates a running path along which the robot cleaner 10 can most effectively run and attend to the instructed operation with respect to the operation area stored in the memory device 81. The control part 80 then controls the driving part 50 and the dust suction part 20 using the running distance sensor 33 and the angle sensor 31 such that the robot cleaner 10 runs along the running path and attends to the instructed operation such as cleaning. When the instructed operation is completed, or when recharging of power is necessary, the control part 80 controls the driving part 50 so that the robot cleaner 10 can return to the recharging station 100. Using generally-known location recognition methods and the front camera, upper camera or ultrasound camera, the control part 80 controls such that the robot cleaner 10 can return to the recharging station 100. This will not be described in detail as it is already well known.

While the robot cleaner 10 runs and operates as instructed, the control part 80 adds up the rotation angles of the robot cleaner 10 to obtain an accumulative sum, and when the accumulative sum exceeds a predetermined value, the control part 80 stops the operation. The control part 80 then controls the driving part 50 to return the robot cleaner 10 to the recharging station 100, and controls, using the plurality of distance sensors 32, such that the robot cleaner 10 is located in the coordinates which correspond with the reference coordinates set from the x and y coordinate system 105 of the recharging station 100. The control part 80 then compensates the current coordinates of the robot cleaner 10 to the origin point.

Figure 6:
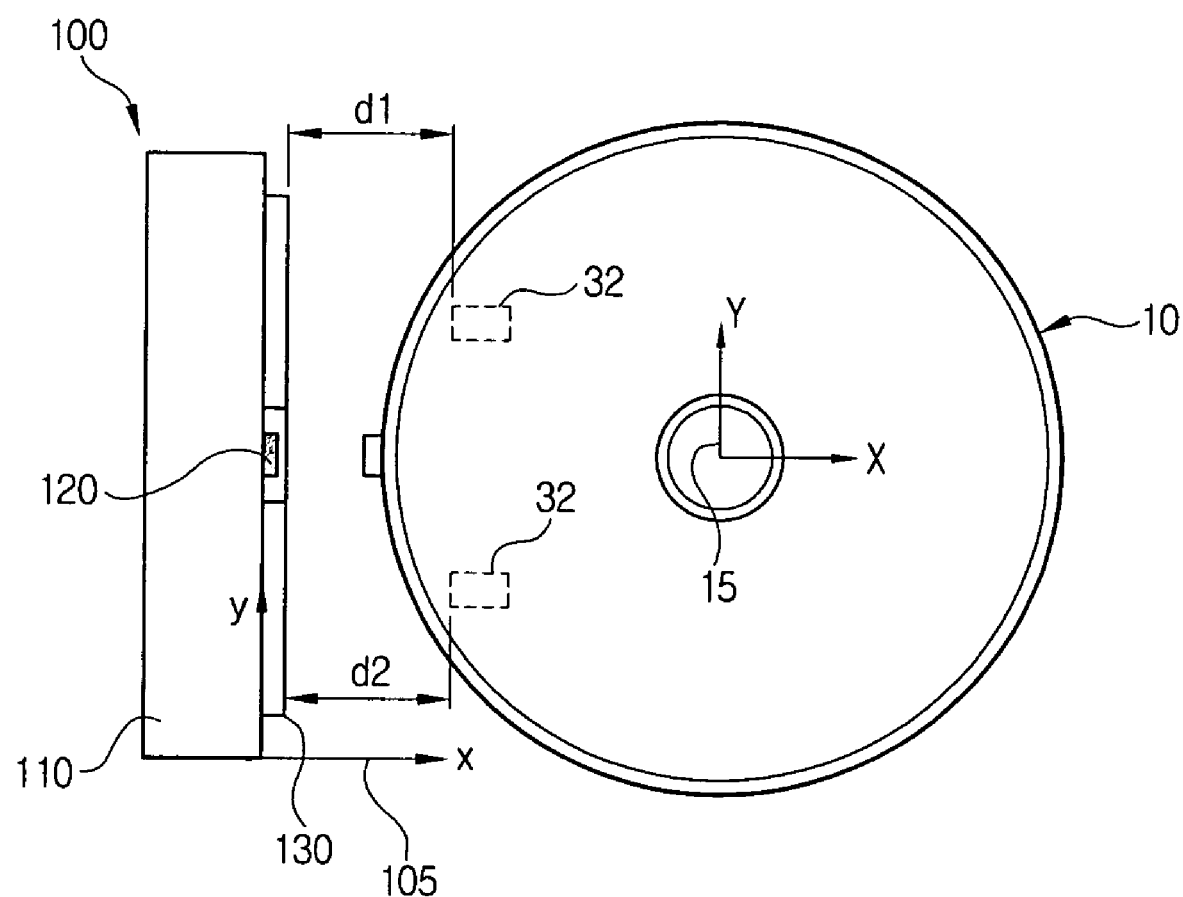
FIG. 6 is a plan view illustrating a robot cleaner system using a coordinate compensation method according to an embodiment of the present invention.
Figure 7:
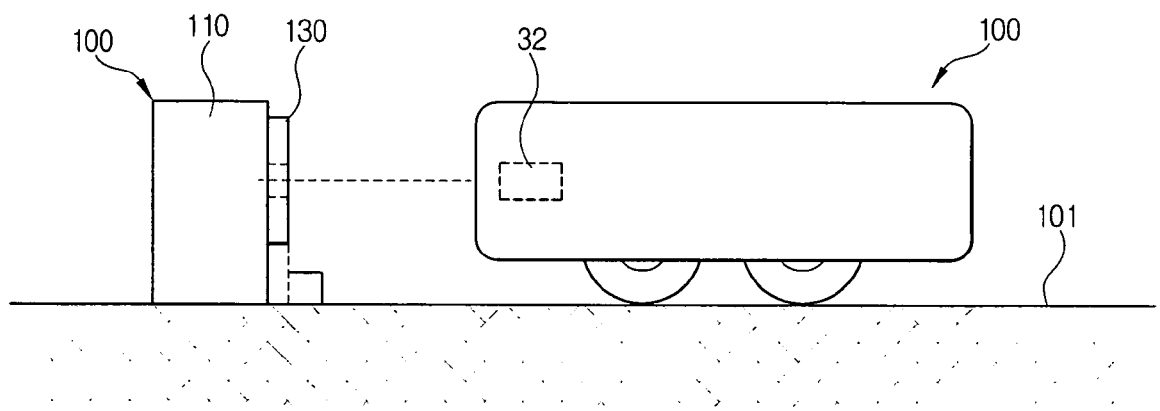
FIG. 7 is a side view of the robot cleaner system of FIG. 6.

The robot cleaner 10 constructed as above constitutes a robot cleaner system together with the recharging station 100. Referring to FIGS. 6 and 7, the recharging station 100 includes a housing 110 which is fixed to the floor 101, a power terminal 120 installed at a side of the housing 110 and connected with a common power source to supply the power, and a reference plate 130 disposed in a substantially perpendicular relation with the floor 101 where the recharging station 100 is installed. The reference plate 130 is sized to reflect all the signals from the plurality of distance sensors 32 of the robot cleaner 10. The floor 101 where the recharging station 100 is installed, may preferably be even so that the robot cleaner 10 can measure the distance to the reference plate 130 by use of distance sensors 32, and compensate coordinates with accuracy.

A coordinate compensation method of a robot cleaner will now be described in greater detail below with reference to FIGS. 4 through 7. More specifically, the coordinate compensation method will be described with reference to a particular example where the robot cleaner 10 attends to coordinate compensation during cleaning operation.

First, the robot cleaner 10 is in standby state at the recharging station 100 (step S10). The robot cleaner 10 memorizes the area for cleaning operation, and has already completed calculation of running path for the effective cleaning operation of the designated area.

Upon receipt of start signal, the robot cleaner 10 departs from the recharging station 100, runs along the planned path and attends to the cleaning operation (step S20). The control part 80, by using the running distance sensor 33 and the angle sensor 31, controls the driving part 50 so that the robot cleaner 10 can follow the planned running path. With respect to FIG. 5, the robot cleaner 10 departed from the recharging station 100 moves toward the spot A, with the running distance sensor 33 senses whether or not the robot cleaner 10 reaches the spot A. When the robot cleaner 10 arrives at spot A, the robot cleaner rotates by 90° by using the angle sensor 31 to correspond to the next running path. Next, the robot cleaner 10 straightforward moves toward the spot B, and checks through the running distance sensor 33 whether it has arrived at spot B or not. When reaching the spot B, the robot cleaner rotates by 90° by using the angle sensor 31 to face the next destination spot C. The control part 80 then controls the driving part 50 using the running distance sensor 33 and the angle sensor 31, to follow the planned running path.

The control part 80 controls the driving part 50 such that the robot cleaner 10 runs along the path as planned, and periodically checks as to whether the accumulative rotational angle of the robot cleaner 10 exceeds a predetermined degree. The accumulative rotational angle refers to the sum of rotational angles of the robot cleaner 10 which are sensed through the angle sensor 31 as the robot cleaner 10 rotates during operation. For example, with reference to FIG. 5, the accumulative rotational angle of the robot cleaner 10 at the spot C is 180°, which adds up 90° at the spot A and another 90° at the spot B.

Accordingly, the control part 80 sums up the rotational angles of the robot cleaner 10 which are sensed each time the robot cleaner 10 is rotated by using the angle sensor 31, memorizes the obtained accumulative sum of the rotational angles, and compares the accumulative sum of the rotational angles with a predetermined accumulative rotational angle. The predetermined accumulative rotational angle may be set by the user. However, it is preferable that the predetermined accumulative rotational angle be set to be as high as possible, within a boundary that does not allow the accumulated error of the angle sensor 31 to influence the operation of the robot cleaner 10 which would subsequently causes certain places of the cleaning area to be left uncleaned. Accordingly, it is necessary that the predetermined accumulative rotational angle is set appropriately in accordance with the accuracy of the angle sensor 31 and cleaning efficiency of the dust suction part 20.

When the accumulative rotational angle exceeds the predetermined value, the control part 80 stops the cleaning operation and controls the driving part 50 to return the robot cleaner 10 to the recharging station 100 (step S30). For example, referring to FIG. 5, if the predetermined accumulative rotational angle is 630°, the control part 80 stops the cleaning operation when the robot cleaner 10 reaches the spot H, and controls the robot cleaner 10 to return to the recharging station 100. At this time, the control part 80 uses ultrasound sensor, or upper or front camera of the main body 11 to return the robot cleaner 10 to the recharging station 100.

When the robot cleaner 10 arrives and is in the recharging station 100, the control part 80 compensates the coordinates such that the x and y coordinate system 15 of the robot cleaner 10 can be parallel with the x and y coordinate system 105 of the recharging station 100, and the origin point of the x and y coordinate system 15 can correspond with the reference coordinates which are at a predetermined distance from the origin spot of the x and y coordinate system 105 of the recharging station 100 (step S40). The reference coordinates are the absolute coordinate system which has the location of the recharging station 100 as the original spot. The reference coordinates may be set by the user in advance. The above operation includes the operation in which the control part 80 of the robot cleaner 10 controls to align the robot cleaner 10 in perpendicular relation with respect to the reference plate 130 of the recharging station 100 by using the plurality of distance sensors 32, and the operation in which the current coordinates of the robot cleaner 10 are compensated to the reference coordinates of the recharging station 100.

The operation of the control part 80 aligning the robot cleaner 10 in perpendicular relation with respect to the reference plate 130 of the recharging station 100 by using two distance sensors 32, will be described in greater detail below.

When the robot cleaner 10 returns to the recharging station 100, the control part 80, using the two distance sensors 32, detects the distances d1 and d2 to the reference plate 130, and determines whether the detected distances d1 and d2 are same. If the detected distances d1 and d2 of the two distance sensors 32 are different from each other, the control part 80 controls the driving part 50 so that the distances d1 and d2 sensed by the two distance sensors 32 can be same. As a result, the x and y coordinate system 15 of the robot cleaner 10 becomes parallel with the x and y coordinate system 105 of the recharging station 100. Next, the control part 80 controls the driving part 50 so that the detected distances d1 and d2 can become as predetermined. As a result, the origin spot 0 of the x and y coordinate system 15 of the robot cleaner 10 is aligned with the reference coordinates of the x and y coordinates system 105 of the recharging station 100. Accordingly, as the control part 80 resets the robot cleaner 10 to the origin spot, the coordinate compensation is completed. Because the robot cleaner 10 returns to the recharging station 100, and the origin is realigned with reference to the coordinate system of the recharging station 100, which serves as the absolute coordinate system, error in accumulative rotational angle due to erroneous detection of the angle sensor 31, becomes zero.

When the coordinate compensation is completed, the control part 80 controls the driving part 50 so that the robot cleaner 10 can move back to the place where it was before it is moved to the recharging station 100. For example, with reference to the example shown in FIG. 5, it is controlled such that the robot cleaner 10 can return back to the spot H. More specifically, the control part 80 re-calculates a path to the previous working spot based on the location information thereof, and returns the robot cleaner 10 by using the running distance sensor 33 and the angle sensor 31. When the robot cleaner 10 returns back at the previous working spot, the robot cleaner 10 resumes the work which was stopped, following the originally planned path. With the present invention as described above in a few exemplary embodiments, the robot cleaner 10 returns to the recharging station 100 and compensates to the origin spot, before the accumulative errors of the angle sensor 31 causes uncleaned areas. Accordingly, the accumulative error of the angle sensor 31 can be kept under a predetermined level while the robot cleaner 10 performs cleaning operation. As a result, because the robot cleaner 10 can perform cleaning operation within a planned running path without deviation, entire operation area can be completely cleaned.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A coordinates compensation method of a robot cleaner, comprising:

controlling the robot cleaner to remain in a standby mode at a recharging station;

moving the robot cleaner from the recharging station to an operation area to perform a given job;

measuring an accumulative rotational angle of the robot cleaner while performing the given job;

stopping the robot cleaner from performing the given job upon determining that the accumulative rotational angle of the robot cleaner exceeds a predetermined level and returning the robot cleaner to the recharging station;

changing current coordinates of the robot cleaner to correspond with reference coordinates of the recharging station; and moving the robot cleaner to a previous spot where it was before it returned to the recharging station and resuming the given job.

2. The coordinates compensation method of claim 1, wherein the the step of changing the current coordinates comprises the steps of:

positioning the robot cleaner on a position representing the reference coordinates of the recharging station by using a plurality of distance sensors; and changing the current coordinates of the robot cleaner to correspond with the reference coordinates of the recharging station.

3. The coordinates compensation method of claim 2, wherein the recharging station comprises a reference plate which is disposed in a substantially perpendicular relation with respect to a floor on which the robot cleaner moves.

4. A coordinates compensation method for a robot cleaner, comprising:
   moving the robot cleaner to perform a given job;
   measuring an accumulative rotational angle of the robot cleaner while performing the given job;
   returning the robot cleaner to a recharging station when the accumulative rotational angle of movement of the robot cleaner exceeds a predetermined level; and
   changing current coordinates of the robot cleaner to correspond with reference coordinates of the recharging station.

5. The coordinates compensation method of claim 4, further comprising moving the robot cleaner to a previous spot where it was before it returned to the recharging station after compensating to the reference coordinates.

6. The coordinates compensation method of claim 5, further comprising resuming the given job.

7. The coordinates compensation method of claim 4, wherein changing the current coordinates of the robot cleaner to correspond with the reference coordinates comprises:
   controlling a plurality of distance sensors to position the robot cleaner a predetermined distance from the recharging station; and
   changing the current coordinates of the robot cleaner by setting them to an origin coordinate of the robot cleaner.

8. The coordinates compensation method of claim 7, wherein the plurality of distance sensors are arranged side by side, with transmitting parts thereof aligned in a substantially perpendicular relation with respect to an axis of a driving wheel of the robot cleaner.

* * * * *